US012716281B2

(12) United States Patent
Xia et al.

(10) Patent No.: US 12,716,281 B2
(45) Date of Patent: Aug. 25, 2026

(54) REFRIGERATOR HAVING HINGE ASSEMBLY

(71) Applicants: QINGDAO HAIER REFRIGERATOR CO., LTD.; HAIER SMART HOME CO., LTD.

(72) Inventors: Enpin Xia, Qingdao City (CN); Hao Zhang, Qingdao City (CN); Xiaobing Zhu, Qingdao City (CN)

(73) Assignees: QINGDAO HAIER REFRIGERATOR CO., LTD, Qingdao (CN); HAIER SMART HOME CO., LTD, Qingdao (CN)

( * ) Notice: Subject to any disclaimer, the term of this patent is extended or adjusted under 35 U.S.C. 154(b) by 86 days.

(21) Appl. No.: 18/774,590

(22) Filed: Jul. 16, 2024

(65) Prior Publication Data

US 2024/0368929 A1 Nov. 7, 2024

Related U.S. Application Data

(62) Division of application No. 17/629,400, filed as application No. PCT/CN2020/072244 on Jan. 15, 2020, now Pat. No. 12,071,797.

(30) Foreign Application Priority Data

Jul. 23, 2019 (CN) ........................ 201910667056.5

(51) Int. Cl.
*E05D 3/02* (2006.01)
*E05D 7/081* (2006.01)
(Continued)

(52) U.S. Cl.
CPC ............ *E05D 3/022* (2013.01); *E05D 7/081* (2013.01); *E05D 11/06* (2013.01); *F25D 23/028* (2013.01);
(Continued)

(58) Field of Classification Search
CPC .......... E05D 3/18; E05D 3/022; E05D 7/081; E05D 11/06; F25D 23/028; E05Y 2800/102; E05Y 2800/12; E05Y 2900/31
See application file for complete search history.

(56) References Cited

U.S. PATENT DOCUMENTS 1,075,130 A 10/1913 Steeberger
3,065,498 A 11/1962 Johnson
(Continued)

FOREIGN PATENT DOCUMENTS

CN 87207236 U 3/1988
CN 1432781 A 7/2003
(Continued)

*Primary Examiner* — Matthew W Ing
(74) *Attorney, Agent, or Firm* — MUNCY, GEISSLER, OLDS & LOWE, P.C.

(57) ABSTRACT

A refrigerator includes a cabinet, a door for opening and closing the cabinet, and a hinge assembly for connecting the cabinet and the door. The cabinet includes a rear wall and an opening provided opposite to each other, a direction from the rear wall towards the opening serves as a first direction, and when the door is in an opening process, the hinge assembly drives the door to move away from the cabinet in the first direction. In the refrigerator, mutual separation of the door and the cabinet may be assisted under the action of the hinge assembly, thereby improving door opening smoothness.

19 Claims, 14 Drawing Sheets

(51) Int. Cl.
*E05D 11/06* (2006.01)
*F25D 23/02* (2006.01)

(52) U.S. Cl.
CPC ..... *E05Y 2800/102* (2013.01); *E05Y 2800/12* (2013.01); *E05Y 2900/31* (2013.01)

(56) References Cited

U.S. PATENT DOCUMENTS

| | | | |
|---|---|---|---|
| 2002/0104191 | A1 | 8/2002 | Matteau |
| 2003/0132689 | A1 | 7/2003 | Shin |
| 2012/0025686 | A1 | 2/2012 | Darney |
| 2019/0186183 | A1 | 6/2019 | He et al. |
| 2020/0124342 | A1 | 4/2020 | Zhang et al. |

FOREIGN PATENT DOCUMENTS

| | | | | |
|---|---|---|---|---|
| CN | 1508500 | A | | 6/2004 |
| CN | 101501288 | A | | 8/2009 |
| CN | 203274419 | U | | 11/2013 |
| CN | 203561139 | U | | 4/2014 |
| CN | 104006604 | A | | 8/2014 |
| CN | 106196819 | A | | 12/2016 |
| CN | 109470008 | A | | 3/2019 |
| DE | 102 39 599 | A1 | | 4/2003 |
| DE | 102010033967 | A1 | | 2/2012 |
| EP | 3495757 | A1 | | 6/2019 |
| JP | S63123976 | A | | 5/1988 |
| JP | 2009097812 | A | * | 5/2009 |

* cited by examiner

REFRIGERATOR HAVING HINGE ASSEMBLY

CROSS-REFERENCE TO RELATED APPLICATIONS

This application is a Divisional of co-pending application Ser. No. 17/629,400 filed on Jan. 23, 2022, which is a US National Stage of International Application No. PCT/CN2020/072244 filed on Jan. 15, 2020, for which priority is claimed under 35 U.S.C. § 120; and this application claims priority of Application No. 201910667056.5 filed in China on Jul. 23, 2019 under 35 U.S.C. § 119; the entire contents of all of which are hereby incorporated by reference.

TECHNICAL FIELD

The present invention relates to the field of household appliance technologies, and in particular, to a refrigerator.

BACKGROUND

Currently, single-shaft hinge assemblies are used in refrigerators, and a door makes circular motion around a fixed shaft of the hinge assembly to be opened and closed, and in an actual operation, due to obstruction of a door seal or other structures, the door may not be opened smoothly.

In view of this, the existing refrigerator is necessary to be improved to solve the above-mentioned problem.

SUMMARY

An object of the present invention is to provide a refrigerator which may effectively improve smoothness of opening a door.

In order to achieve one of the above objects of the present invention, an embodiment of the present invention provides a refrigerator, comprising a cabinet, a door for opening and closing the cabinet, and a hinge assembly for connecting the cabinet and the door, the cabinet comprises a rear wall and an opening provided opposite to each other, and a direction from the rear wall towards the opening serves as a first direction, and when the door is in an opening process, the hinge assembly drives the door to move away from the cabinet in the first direction.

As a further improvement of an embodiment of the present invention, the cabinet further comprises an accommodating chamber and a pivot side connected with the hinge assembly, and when the door is in the opening process, the hinge assembly drives the door to move away from the cabinet in the first direction, and meanwhile, the hinge assembly drives the door to move from the pivot side towards the accommodating chamber.

As a further improvement of an embodiment of the present invention, the cabinet further comprises an outer side surface adjacent to the hinge assembly and located on an extension section of a rotation path of the door, and a front end surface provided around the opening; the door comprises a door body and a door gasket connected to each other, and the door gasket comprises a side door gasket close to the outer side surface; when the door is in a closed state, the door gasket and the front end surface contact each other; and when the door is in the opening process, a distance between the side door gasket and the front end surface increases.

As a further improvement of an embodiment of the present invention, the hinge assembly comprises a first shaft, a first groove, a second shaft and a second groove, the first shaft and the first groove are fitted with each other, the second shaft and the second groove are fitted with each other, the first shaft is located in one of the cabinet and the door, the first groove is located in the other of the cabinet and the door, the second shaft is located in one of the cabinet and the door, and the second groove is located in the other of the cabinet and the door.

As a further improvement of an embodiment of the present invention, the first shaft and the second shaft are located at the cabinet, and the first groove and the second groove are located at the door.

As a further improvement of an embodiment of the present invention, the first groove comprises an initial position and a pivot position, and the second groove comprises a first end, a second end, a first section and a second section, the first end and the second end being provided oppositely, and the first section and the second section being located between the first end and the second end and connected with each other; when the door is in the closed state, the first shaft is located at the initial position, and the second shaft is located at the first end; when the door is opened from the closed state to a first opening angle, the second shaft moves in the first section to drive the first shaft to move from the initial position to the pivot position, and the door moves away from the cabinet in the first direction; when the door is continuously opened from the first opening angle to a maximum opening angle, the first shaft is kept at the pivot position, and the second shaft moves in the second section around the first shaft.

As a further improvement of an embodiment of the present invention, the first groove comprises an initial position and a pivot position, and the second groove comprises a first end, a second end, a first section, a second section and a third section, the first end and the second end being provided oppositely, and the first section, the second section and the third section being located between the first end and the second end and connected; when the door is in the closed state, the first shaft is located at the initial position, and the second shaft is located at the first end; when the door is opened from the closed state to a first opening angle, the first shaft is kept at the initial position, and the second shaft moves in the first section around the first shaft; when the door is continuously opened from the first opening angle to a second opening angle, the second shaft moves in the second section to drive the first shaft to move from the initial position to the pivot position, and the door moves away from the cabinet in the first direction; when the door is continuously opened from the second opening angle to a maximum opening angle, the first shaft is kept at the pivot position, and the second shaft moves in the third section around the first shaft.

As a further improvement of an embodiment of the present invention, the door is provided with a first fitting portion, the cabinet is provided with a second fitting portion, the first fitting portion and the second fitting portion are engaged with each other when the door is in the closed state, and when the door is opened from the closed state to the first opening angle, the second shaft moves in the first section around the first shaft to drive the first fitting portion to be disengaged from the second fitting portion.

As a further improvement of an embodiment of the present invention, the door comprises a front wall apart from the cabinet and a side wall always interposed between the front wall and the cabinet, a distance between the initial position and the front wall is less than a distance between the pivot position and the front wall, and a distance between the initial position and the side wall is greater than a distance between the pivot position and the side wall.

As a further improvement of an embodiment of the present invention, the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the door is in the closed state, the vertical beam extends to the second door; when the door is opened from the closed state to the first opening angle, the vertical beam rotates towards a side close to the cabinet, such that a first folding angle is formed between the first door and the vertical beam, and when the door is continuously opened from the first opening angle to the maximum opening angle, the vertical beam and the first door are kept relatively static.

In order to achieve one of the above objects of the present invention, an embodiment of the present invention provides a refrigerator, comprising a cabinet, a door for opening and closing the cabinet, and a hinge assembly for connecting the cabinet and the door, the cabinet comprises a rear wall and an opening provided opposite to each other, and a direction from the rear wall towards the opening serves as a first direction; the hinge assembly comprises a first shaft, a first groove, a second shaft and a second groove, the first shaft and the first groove are fitted with each other, and the second shaft and the second groove are fitted with each other; the first groove comprises an initial position and a pivot position, and the second groove comprises a first end, a second end, a first section and a second section, the first end and the second end being provided oppositely, and the first section and the second section being located between the first end and the second end and connected with each other; when the door is in the closed state, the first shaft is located at the initial position, and the second shaft is located at the first end; when the door is opened from the closed state to a first opening angle, the second shaft moves in the first section to drive the first shaft to move from the initial position to the pivot position, and the door moves away from the cabinet in the first direction; when the door is continuously opened from the first opening angle to a maximum opening angle, the first shaft is kept at the pivot position, and the second shaft moves in the second section around the first shaft.

As a further improvement of an embodiment of the present invention, the cabinet comprises an outer side surface adjacent to the hinge assembly and located on an extension section of a rotation path of the door, and a front end surface provided around the opening; the door comprises a door body and a door gasket connected to each other, and the door gasket comprises a side door gasket close to the outer side surface; when the door is in a closed state, the door gasket and the front end surface contact each other; and when the door is opened from the closed state to a first opening angle, a distance between the side door gasket and the front end surface increases.

Compared with a prior art, the present invention has the beneficial effects as follows. In an embodiment of the present invention, mutual separation of the door and a cabinet may be assisted under the action of a hinge assembly, thereby improving the door opening smoothness.

DETAILED DESCRIPTION

Figure 1:
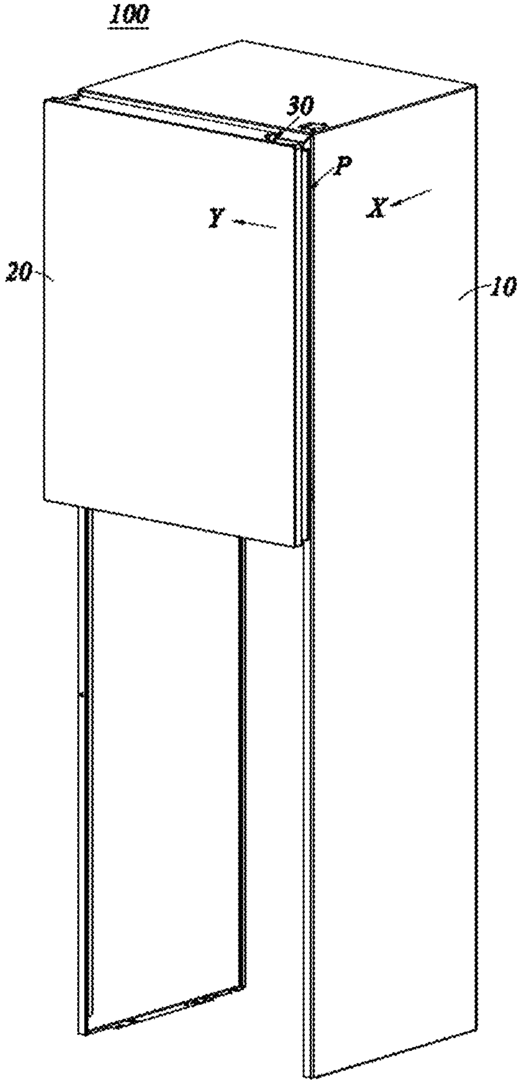
FIG. 1 is a perspective view of a refrigerator according to an embodiment of the present invention.

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", "lower", "below", "left", "right", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein.

Figure 2:
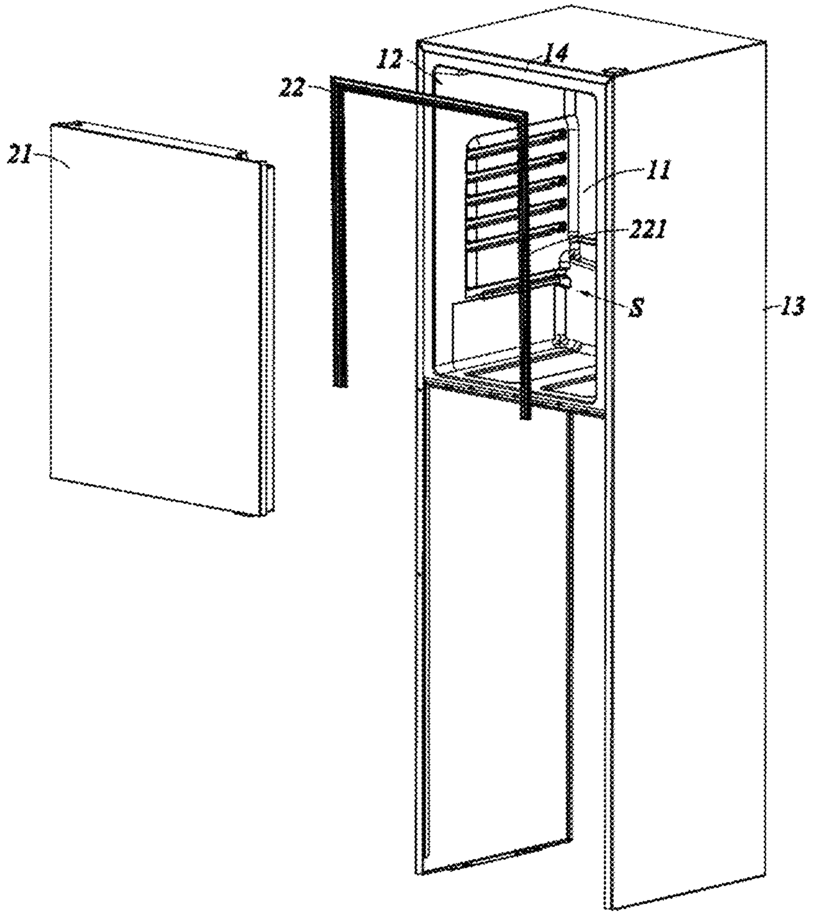
FIG. 2 is a schematic diagram of a refrigerator according to an embodiment of the present invention with a door body omitted.
Figure 3:
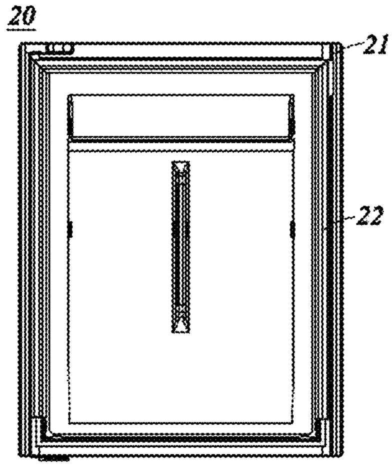
FIG. 3 is a schematic diagram of a door in an embodiment of the present invention.

FIGS. 1 to 3 are schematic diagrams of a refrigerator 100 according to an embodiment of the present invention.

The refrigerator 100 includes a cabinet 10, a door 20 for opening and closing the cabinet 10, and a hinge assembly 30 for connecting the cabinet 10 and the door 20.

The cabinet 10 includes a rear wall 11 and an opening 12 which are provided opposite to each other, and a direction from the rear wall 11 towards the opening 12 serves as a first direction X.

Here, the first direction X is a direction from the rear to the front of the refrigerator 100.

When the door 20 is in an opening process, the hinge assembly 30 drives the door 20 to move away from the cabinet 10 in the first direction X.

Here, in the opening process of the door 20, the door 20 moves away from the cabinet 10 in the first direction X; that is, the door 20 moves away from a front end of the cabinet 10, such that mutual separation of the door 20 and the cabinet 10 may be assisted under the action of the hinge assembly 30, thereby improving door opening smoothness.

In the present embodiment, the cabinet 10 further includes an outer side surface 13 adjacent to the hinge assembly 30 and located on an extension section of a rotation path of the door 20, and a front end surface 14 provided around the opening 12.

Here, a left side surface or a right side surface of the cabinet 10 serves as the outer side surface 13, different hinge assemblies 30 may correspond to different outer side surfaces 13, and an end surface of the cabinet 10 close to the door 20 serves as the front end surface 14.

The door 20 includes a door body 21 and a door gasket 22 connected to each other, and the door gasket 22 includes a side door gasket 221 close to the outer side surface 13.

Here, the door gasket 22 is annularly provided on a side surface of the door body 21 close to the cabinet 10, and the side door gasket 221 is a door gasket provided closest to the hinge assembly 30 in a vertical direction.

When the door 20 is in a closed state, the door gasket 22 and the front end surface 14 contact each other.

Here, the door gasket 22 and the front end surface 14 contact each other to achieve a sealing fitting effect between the door 20 and the cabinet 10, and generally, a sealing effect may be improved by pressurization, magnetic attraction, and other actions of the door gasket 22.

When the door 20 is in the opening process, a distance between the side door gasket 221 and the front end surface 14 is increased.

Here, in the opening process of the door 20, the door 20 moves away from the cabinet 10 in the first direction X, and the distance between the side door gasket 221 and the front end surface 14 increases; that is, the hinge assembly 30 may assist separation of the door gasket 22 from the front end surface 14 of the cabinet 10, thus avoiding that the door 20 is unable to be smoothly separated from the cabinet 10 due to obstruction of the door gasket 22 (for example, the door gasket 22 is excessively pressed, and a magnetic attraction acting force is excessively high), and facilitating a user to open the door 20.

It should be noted that the refrigerator 100 according to the present embodiment is not limited to being applied to avoiding the obstruction of the door gasket 22, and may also be applied to a case where other structures obstruct the opening process of the door 20 (for example, frost is formed between the cabinet 10 and the door 20).

In the present embodiment, the cabinet 10 includes an accommodating chamber S and a pivot side P connected with the hinge assembly 30.

Here, the "pivot side P" is defined as a region where the door 20 is rotated relative to the cabinet 10, i.e., a region where the hinge assembly 30 is provided, and a direction from the pivot side P to the accommodating chamber S is defined as a second direction Y.

When the door 20 is in the opening process, the hinge assembly 30 drives the door 20 to move away from the cabinet 10 in the first direction X, and meanwhile, the hinge assembly 30 drives the door 20 to move from the pivot side P towards the accommodating chamber S.

Here, in the opening process of the door 20, the door 20 moves towards a side of the accommodating chamber S; that is, at this point, the door 20 rotates relative to the cabinet 10 and is displaced relative to the cabinet 10 in the second direction Y, thus greatly reducing a distance by which the door 20 protrudes out of the cabinet 10 towards a side apart from the accommodating chamber S in the rotation process; that is, the displacement of the door 20 in the second direction Y counteracts a part of the door 20 protruding out of the cabinet 10 in the rotation process, thereby preventing the door 20 from interfering with a peripheral cupboard or wall, or the like, in the opening process; the refrigerator is suitable for an embedded cupboard or a scenario with a small space for accommodating the refrigerator 100.

It should be noted that, in the opening process of the door 20 in the present embodiment, the door 20 moves in the first direction X and the second direction Y simultaneously, such that the door 20 is opened smoothly, and the door 20 does not interfere with the peripheral cupboard or wall, or the like.

Figure 4:
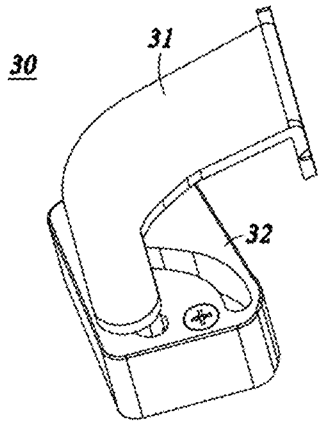
FIG. 4 is a schematic diagram of a hinge assembly in an embodiment of the present invention.
Figure 5:
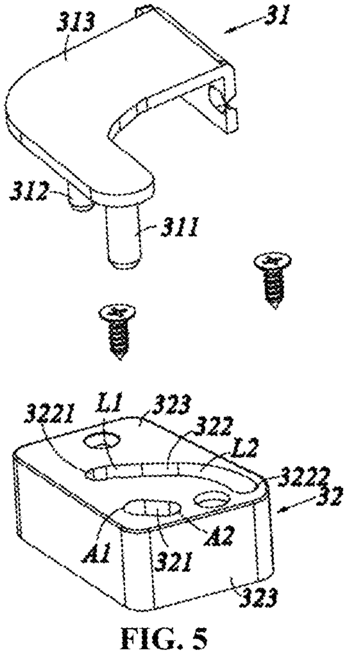
FIG. 5 is an exploded view of a hinge assembly in an embodiment of the present invention.

Referring to FIGS. 4 and 5, in the present embodiment, the hinge assembly 30 includes a first shaft 311, a first groove 321, a second shaft 312 and a second groove 322, the first shaft 311 and the first groove 321 are fitted with each other, the second shaft 312 and the second groove 322 are fitted with each other, the first shaft 311 is located in one of the cabinet 10 and the door 20, the first groove 321 is located in the other of the cabinet 10 and the door 20, the second shaft 312 is located in one of the cabinet 10 and the door 20, and the second groove 322 is located in the other of the cabinet 10 and the door 20.

That is, the hinge assembly 30 may be distributed in various ways; in a first example, the first shaft 311 and the second shaft 312 are located at the cabinet 10, and the first groove 321 and the second groove 322 are located at the door 20; in a second example, the first shaft 311 and the second shaft 312 are located at the door 20, and the first groove 321 and the second groove 322 are located at the cabinet 10; in a third example, the first shaft 311 and the second groove 322 are located at the cabinet 10, and the first groove 321 and the second shaft 312 are located at the door 20; in a fourth example, the first shaft 311 and the second groove 322 are located at the door 20, and the first groove 321 and the second shaft 312 are located at the cabinet 10.

Here, the first example is taken as an example; that is, the first shaft 311 and the second shaft 312 are located at the cabinet 10, and the first groove 321 and the second groove 322 are located at the door 20.

Specifically, the hinge assembly 30 includes a first hinge part 32 and a second hinge part 31 which are fitted with each other, the first hinge part 32 is located at the door 20, and the second hinge part 31 is located at the cabinet 10.

The first hinge part 32 includes a first hinge part body 323, as well as the first groove 321 and the second groove 322 recessed in the first hinge part body 323.

The second hinge part 31 includes a second hinge part body 313, as well as the first shaft 311 and the second shaft 312 protruding from the second hinge part body 313, and the second hinge part body 313 and the cabinet 10 are fixed to each other.

First Specific Example

In the first specific example, referring to FIGS. 6 to 11, a first groove 321 includes an initial position A1 and a pivot position A2, and a second groove 322 includes a first end 3221, a second end 3222, a first section L1 and a second section L2, the first end and the second end being provided oppositely, and the first section and the second section being located between the first end 3221 and the second end 3222 and connected with each other.

Figure 6:
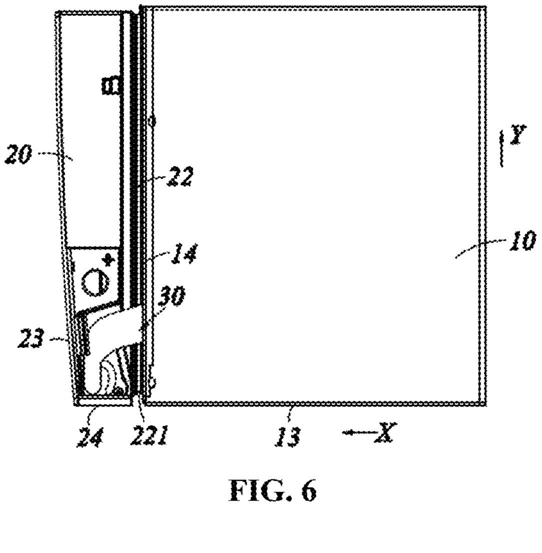
FIG. 6 is a top view of the refrigerator in a first specific example of the present invention in a closed state.
Figure 7:
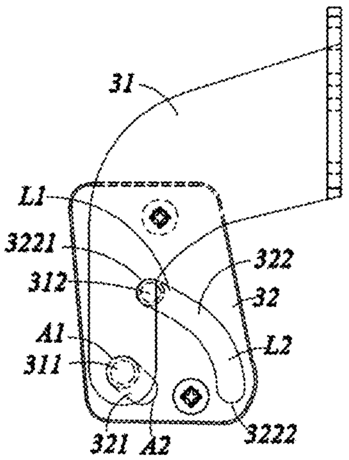
FIG. 7 is a perspective view of the hinge assembly in FIG. 6.

Referring to FIGS. 6 and 7, when the door 20 is in a closed state, a first shaft 311 is located at the initial position A1, a second shaft 312 is located at the first end 3221, and the door gasket 22 and the front end surface 14 of the cabinet 10 contact each other to achieve a sealing effect.

Figure 8:
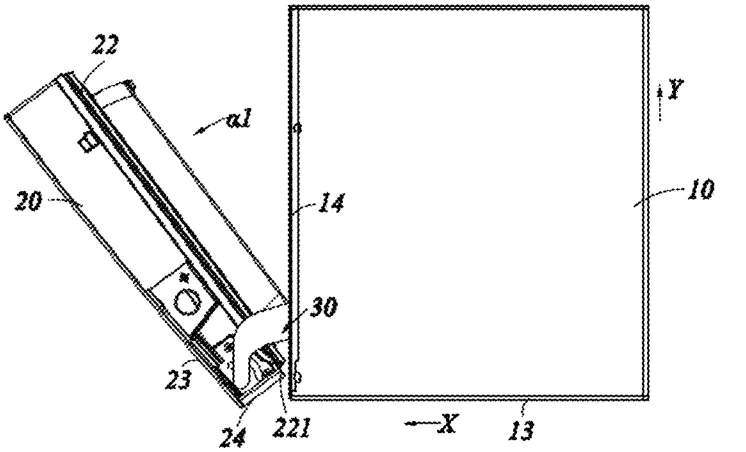
FIG. 8 is a top view of the refrigerator in the first specific example of the present invention opened to a first opening angle.
Figure 9:
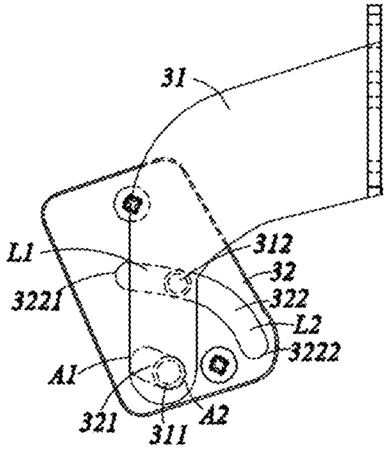
FIG. 9 is a perspective view of the hinge assembly in FIG. 8.

Referring to FIGS. 8 and 9, when the door 20 is opened from the closed state to a first opening angle $\alpha 1$, the second shaft 312 moves in the first section L1 to drive the first shaft 311 to move from the initial position A1 to the pivot position A2, the door 20 moves away from the cabinet 10 in the first direction X, the distance between the side door gasket 221 and the front end surface 14 increases, and meanwhile, the door 20 moves from the pivot side P towards the accommodating chamber S.

In a prior art, since a single-shaft hinge assembly is adopted, the door always rotates in situ relative to the cabinet; in an actual operation, factors, such as a thickness of the door gasket, a thickness of the door, or the like, are required to be considered to design an axis position in the hinge assembly, such that the door gasket does not obstruct the opening process of the door; however, the design process of the axis position is complex, and the axis position is unable to be kept at a pre-designed position due to influences of factors, such as mounting precision, or the like.

In the present specific example, the door 20 moves away from the front end of the cabinet 10 through cooperation of the double shafts (the first shaft 311 and the second shaft 312) and the double grooves (the first groove 321 and the second groove 322), thus effectively solving the problem of the obstruction of the opening process of the door 20 by the door gasket 22, avoiding high mounting precision, and greatly reducing a design cost and mounting difficulty.

In addition, it should be noted that, at the moment when the door 20 is opened, the hinge assembly 30 drives the door 20 to move away from the front end of the cabinet 10, so as to effectively assist the opening process of the door 20; meanwhile, the hinge assembly 30 drives the door 20 to move from the pivot side P towards the accommodating chamber S, so as to prevent the door 20 from protruding from the cabinet 10.

Figure 10:
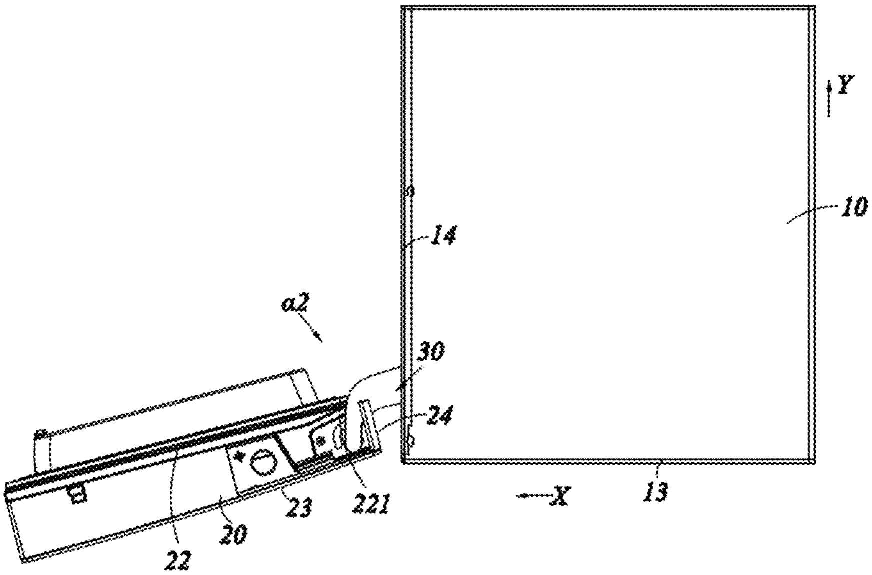
FIG. 10 is a top view of the refrigerator in the first specific example of the present invention opened to a second opening angle.
Figure 11:
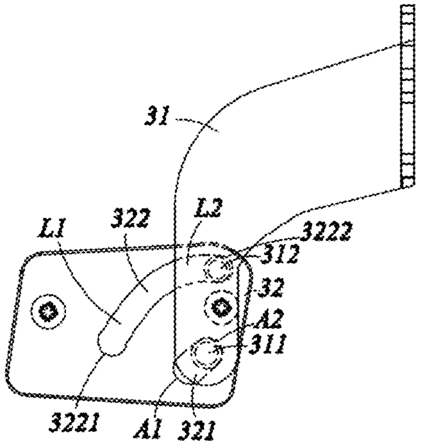
FIG. 11 is a perspective view of the hinge assembly in FIG. 10.

With reference to FIGS. 10 and 11, when the door 20 is continuously opened from the first opening angle $\alpha 1$ to a maximum opening angle $\alpha 2$, the first shaft 311 is kept at the pivot position A2, and the second shaft 312 moves in the second section L2 around the first shaft 311.

Here, the maximum opening angle $\alpha 2$ is greater than 90°.

It should be noted that the refrigerator 100 in the present example may be configured as a single-door refrigerator, or the like.

In the present specific example, the door 20 includes a front wall 23 apart from the cabinet 10 and a side wall 24 always interposed between the front wall 23 and the cabinet 10.

Here, a front surface of the door 20 serves as the front wall 23, and a side surface of the door 20 serves as the side wall 24.

A distance between the initial position A1 and the front wall 23 is less than a distance between the pivot position A2 and the front wall 23, and a distance between the initial position A1 and the side wall 24 is greater than a distance between the pivot position A2 and the side wall 24.

Specifically, a distance between a center of the first shaft 311 at the initial position A1 and the front wall 23 is less than a distance between a center of the first shaft 311 at the pivot position A2 and the front wall 23.

A distance between the center of the first shaft 311 at the initial position A1 and the side wall 24 is greater than a distance between the center of the first shaft 311 at the pivot position A2 and the side wall 24.

A first distance is formed between the center of the first shaft 311 and the front wall 23, a second distance is formed between the center of the first shaft 311 and the side wall 24, and the first distance and the second distance are changed in the opening process of the door 20.

When the door 20 is opened from the closed state to the first opening angle $\alpha 1$, the first distance increases, and the second distance decreases, and when the door 20 is continuously opened from the first opening angle $\alpha 1$ to the maximum opening angle $\alpha 2$, both the first distance and the second distance are kept unchanged.

Here, when the door 20 is opened from the closed state to the first opening angle $\alpha 1$, the increase of the first distance corresponds to the movement of the door 20 in the first direction X, and the decrease of the second distance corresponds to the movement of the door 20 in the second direction Y.

Second Specific Example

FIGS. 12 to 19 are schematic diagrams of the second specific example of the present invention, and similar structures are numbered similarly for ease of understanding.

In the second specific example, a first groove 321' includes an initial position A1' and a pivot position A2', and a second groove 322' includes a first end 3221', a second end 3222', a first section L1', a second section L2' and a third section L3', the first end 3221' and the second end 3222' being provided oppositely, and the first section L1', the second section L2' and the third section L3' being located between the first end 3221' and the second end 3222' and connected.

Figure 12:
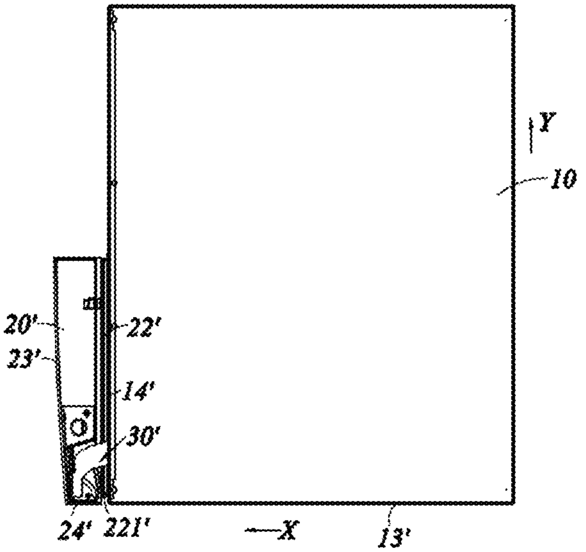
FIG. 12 is a top view of the refrigerator in a second specific example of the present invention in the closed state.
Figure 13:
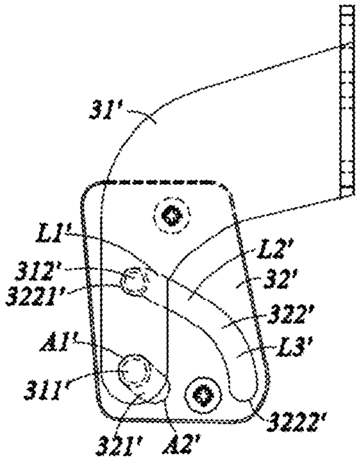
FIG. 13 is a perspective view of the hinge assembly in FIG. 12.

Referring to FIGS. 12 and 13, when the door 20' is in a closed state, a first shaft 311' is located at the initial position A1', a second shaft 312' is located at the first end 3221', and the door gasket 22' and the front end surface 14' of the cabinet 10' contact each other to achieve a sealing effect.

Figure 14:
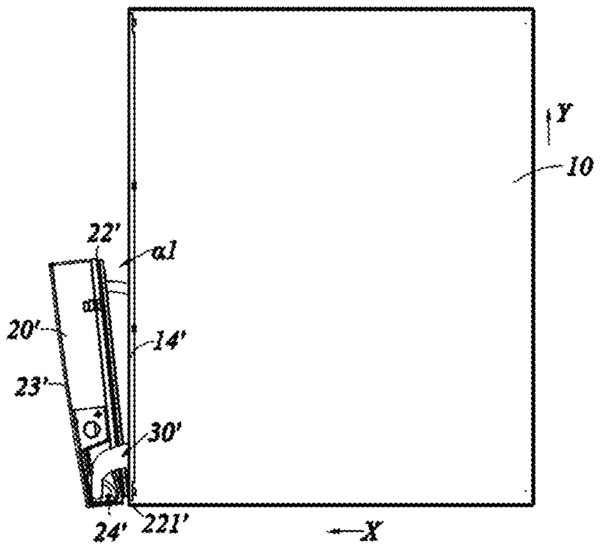
FIG. 14 is a top view of the refrigerator in the second specific example of the present invention opened to the first opening angle.
Figure 15:
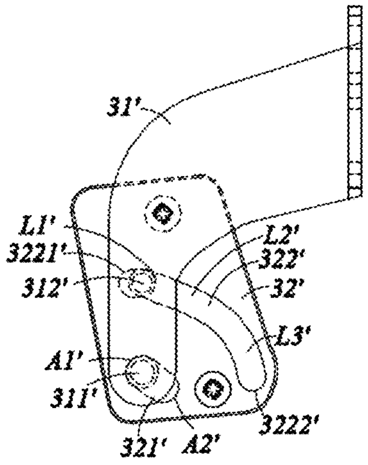
FIG. 15 is a perspective view of the hinge assembly in FIG. 14.

Referring to FIGS. 14 and 15, when the door 20' is opened from the closed state to the first opening angle α1, the first shaft 311' is kept at the initial position A1', and the second shaft 312' moves in the first section L1' around the first shaft 311'.

Figure 16:
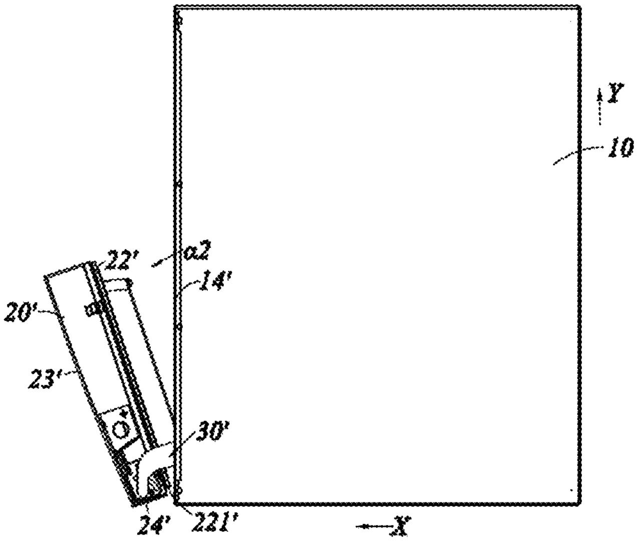
FIG. 16 is a top view of the refrigerator in the second specific example of the present invention opened to the second opening angle.
Figure 17:
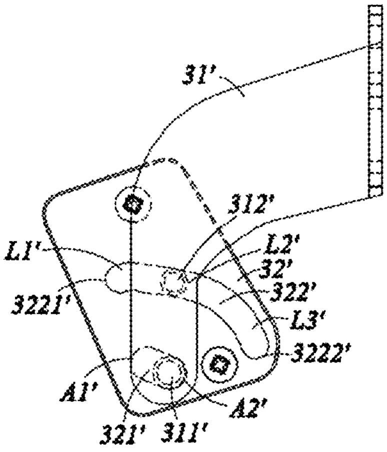
FIG. 17 is a perspective view of the hinge assembly in FIG. 16.

Referring to FIGS. 16 and 17, when the door 20' is continuously opened from the first opening angle α1 to a second opening angle α2, the second shaft 312' moves in the second section L2' to drive the first shaft 311' to move from the initial position A1' to the pivot position A2', the door 20' moves away from the cabinet 10' in the first direction X', the distance between the side door gasket 221' and the front end surface 14' increases, and meanwhile, the door 20' moves from the pivot side P towards the accommodating chamber S.

In a prior art, since a single-shaft hinge assembly is adopted, the door always rotates in situ relative to the cabinet; in an actual operation, factors, such as a thickness of the door gasket, a thickness of the door, or the like, are required to be considered to design an axis position in the hinge assembly, such that the door gasket does not obstruct the opening process of the door; however, the design process of the axis position is complex, and the axis position is unable to be kept at a pre-designed position due to influences of factors, such as mounting precision, or the like.

In the present specific example, the door 20' moves away from the front end of the cabinet 10' through cooperation of the double shafts (the first shaft 311' and the second shaft 312') and the double grooves (the first groove 321' and the second groove 322'), thus effectively solving the problem of the obstruction of the opening process of the door 20' by the door gasket 22', avoiding high mounting precision, and greatly reducing a design cost and mounting difficulty.

In addition, it should be noted that, in the opening process of the door 20', the hinge assembly 30' drives the door 20' to move away from the front end of the cabinet 10', so as to effectively assist the opening process of the door 20'; meanwhile, the hinge assembly 30' drives the door 20' to move from the pivot side P towards the accommodating chamber S, so as to prevent the door 20' from protruding from the cabinet 10'.

Figure 18:
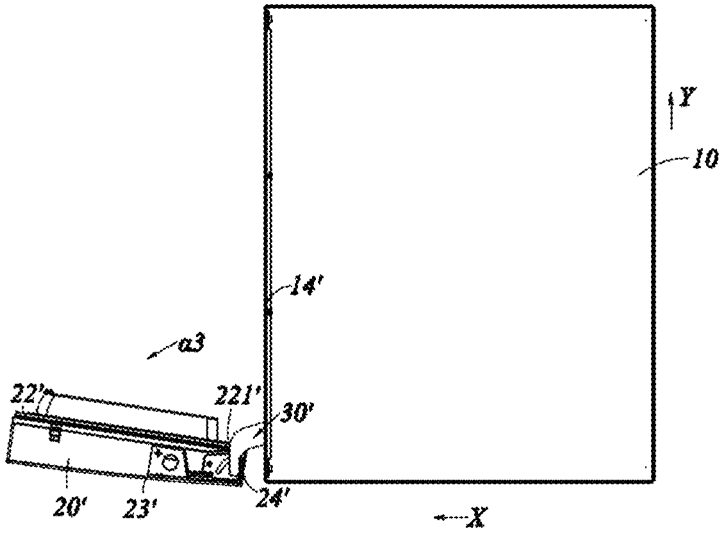
FIG. 18 is a top view of the refrigerator in the second specific example of the present invention opened to a third opening angle.
Figure 19:
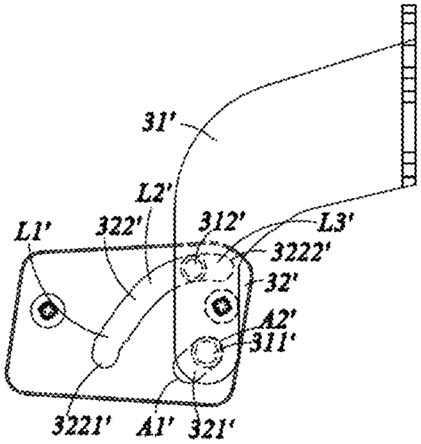
FIG. 19 is a perspective view of the hinge assembly in FIG. 18.

With reference to FIGS. 18 and 19, when the door 20' is continuously opened from the second opening angle α2 to a maximum opening angle α3, the first shaft 311' is kept at the pivot position A2', and the second shaft 312' moves in the third section L3' around the first shaft 311'.

Here, the maximum opening angle α3 is greater than 90°.

In the present specific example, the door 20' includes a front wall 23' apart from the cabinet 10' and a side wall 24' always interposed between the front wall 23' and the cabinet 10'.

Here, a front surface of the door 20' serves as the front wall 23', and a side surface of the door 20' serves as the side wall 24'.

A distance between the initial position A1' and the front wall 23' is less than a distance between the pivot position A2' and the front wall 23', and a distance between the initial position A1' and the side wall 24' is greater than a distance between the pivot position A2' and the side wall 24'.

Specifically, a distance between a center of the first shaft 311' at the initial position A1' and the front wall 23' is less than a distance between a center of the first shaft 311' at the pivot position A2' and the front wall 23'.

A distance between the center of the first shaft 311' at the initial position A1' and the side wall 24' is greater than a distance between the center of the first shaft 311' at the pivot position A2' and the side wall 24'.

A first distance is formed between the center of the first shaft 311' and the front wall 23', a second distance is formed between the center of the first shaft 311' and the side wall 24', and the first distance and the second distance are changed in the opening process of the door 20'.

When the door 20' is opened from the closed state to the first opening angle α1, the first distance increases, and the second distance decreases, and when the door 20' is continuously opened from the first opening angle α1 to the maximum opening angle α2, both the first distance and the second distance are kept unchanged.

Third Specific Example

In the third specific example, in conjunction with the description of the second specific example and referring to FIGS. 20 to 23, the door 20' is further provided with a first fitting portion 25', and the cabinet 10' is further provided with a second fitting portion 15'.

Figure 20:
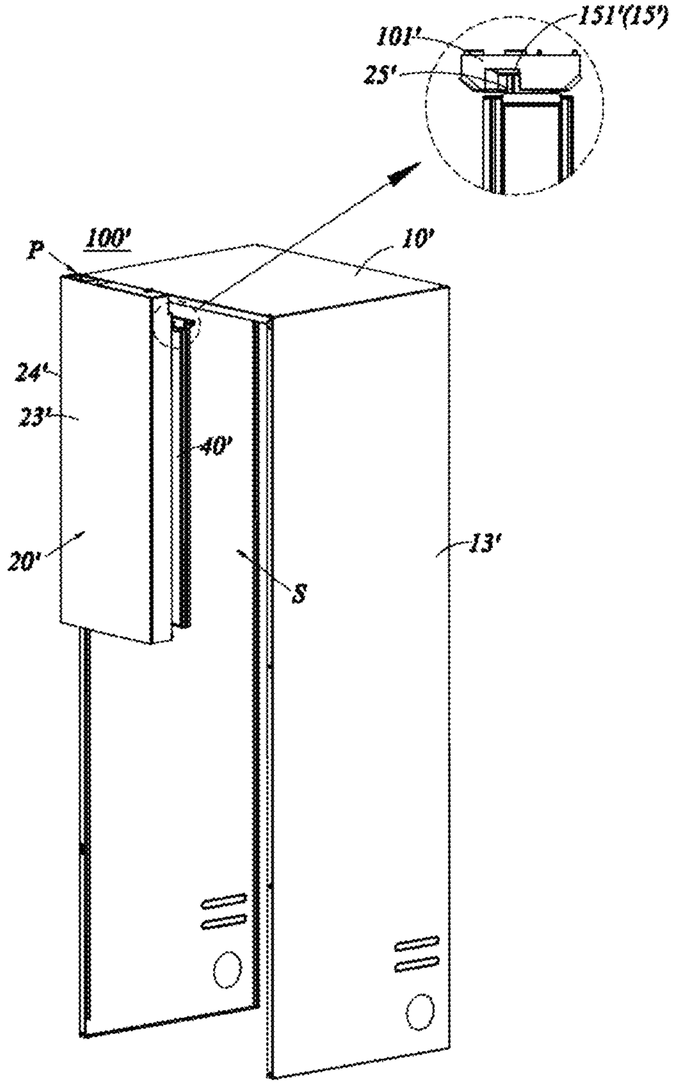
FIG. 20 is a perspective view of the refrigerator in a third specific example of the present invention in the closed state.

Referring to FIG. 20, when the door 20' is in the closed state, the first fitting portion 25' and the second fitting portion 15' are engaged with each other.

Here, the first fitting portion 25' and the second fitting portion 15' are engaged with each other to close the door 20' and the cabinet 10', and specific forms of the first fitting portion 25' and the second fitting portion 15' may be determined according to actual situations.

Figure 21:
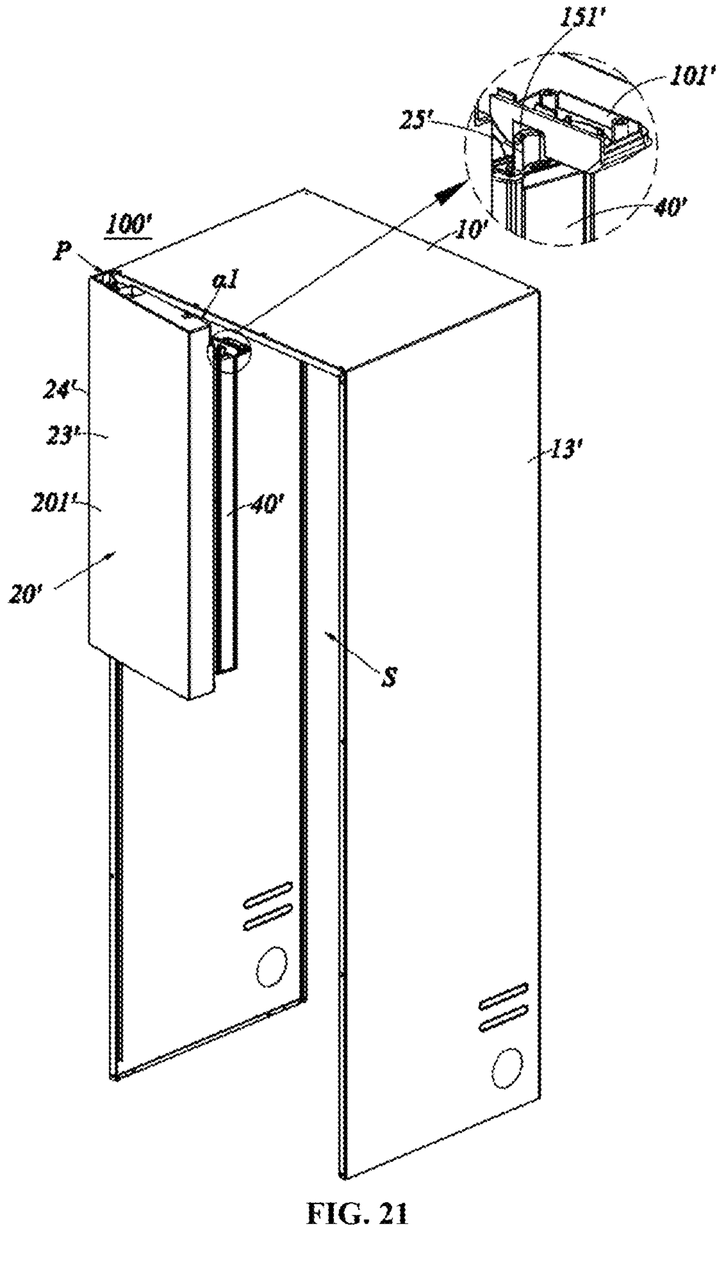
FIG. 21 is a perspective view of the refrigerator in the third specific example of the present invention opened to the first opening angle.

Referring to FIG. 21, when the door 20' is opened from the closed state to the first opening angle α1, the second shaft 312' moves in the first section L1' around the first shaft 311', so as to drive the first fitting portion 25' to be disengaged from the second fitting portion 15'.

Here, when opened to the first opening angle α1 from the closed state, the door 20' rotates in situ relative to the cabinet 10'; that is, the door 20' only rotates without generating displacement in other directions, thus effectively avoiding that the first fitting portion 25' is unable to be disengaged from the second fitting portion 15' due to the displacement in a certain direction of the door 20'.

Figure 22:
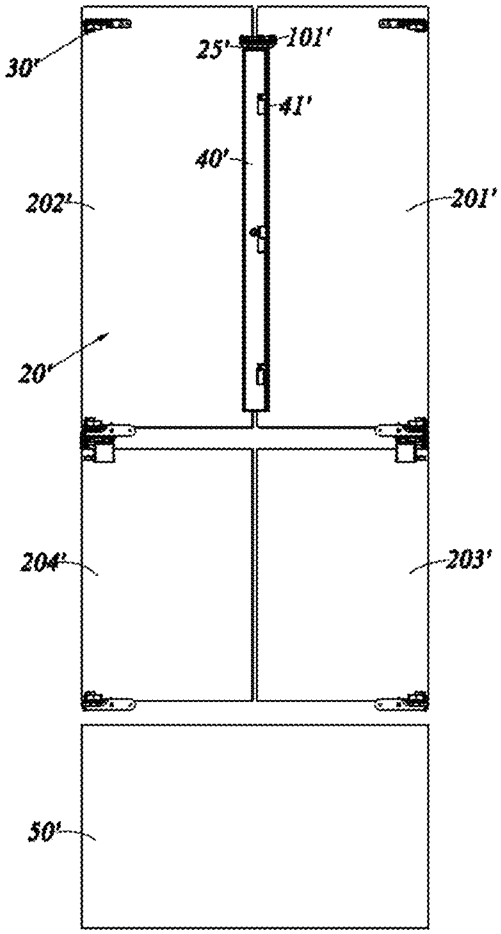
FIG. 22 is a rear view of the refrigerator in the third specific example of the present invention (with some elements omitted)
Figure 23:
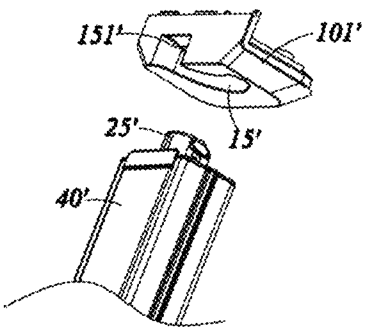
FIG. 23 is an exploded view of a first fitting portion and a second fitting portion in the third specific example of the present invention.

Referring to FIGS. 22 and 23, in the present specific example, the door 20' includes a first door 201' and a second door 202' pivotally connected with the cabinet 10' and arranged side by side in a horizontal direction.

The refrigerator 100' further includes a vertical beam 40' movably connected to a side of the first door 201' close to the second door 202', and the first fitting portion 25' is provided at the vertical beam 40'.

Here, the vertical beam 40' is movably connected to a right side of the first door 201', the vertical beam 40' and the first door 201' may be connected by a return spring 41', and the vertical beam 40' rotates relative to the first door 201' around an axis in a vertical direction; in other words, under the action of the return spring 41', the vertical beam 40' may rotate relative to the first door 201' and be kept at a predetermined position.

The first fitting portion 25' is configured as a bump 25' protruding upwards from the vertical beam 40'.

The second fitting portion 15' is fixedly provided on the cabinet 10'; for example, the second fitting portion 15' is configured as a groove 15' in a base 101', the base 101' is fixedly provided at a top of the cabinet 10', a notch 151' is provided in an end of the groove 15', the notch 151' has a forward opening, the bump 25' and the groove 15' are both arc-shaped, and the bump 25' enters or leaves the groove 15' through the notch 151' to achieve mutual limitation and separation of the bump 25' and the groove 15'.

Certainly, it may be understood that specific structures of the first and second fitting portions 25', 15' are not limited to the above description; that is, the first fitting portion 25' is not limited to the bump 25' at the vertical beam 40', the second fitting portion 15' is not limited to the groove 15' fitted with the bump 25', and the first and second fitting portions 25', 15' may be configured as structures fitted with each other in other regions of the refrigerator 100'.

In the present example, the door 20' further includes a third door 203' and a fourth door 204' pivotally connected to the cabinet 10' and arranged side by side in the horizontal direction, the third door 203' is located below the first door 201', the fourth door 204' is located below the second door 202', and the refrigerator 100' further includes a drawer 50' located below the third door 203' and the fourth door 204'.

Here, the chamber corresponding to the first door 201' and the second door 202' is configured as a refrigerating chamber; that is, the refrigerating chamber has a side-by-side structure; the third door 203' and the fourth door 204' correspond to two independent variable temperature compartments respectively; the drawer 50' is configured as a freezing drawer.

It should be noted that the refrigerator 100' includes a fixed beam fixed inside the cabinet 10' and configured to separate the two variable temperature compartments, and the third door 203' and the fourth door 204' may be fitted with the fixed beam to achieve a sealing effect; that is, at this point, no vertical beam is required to be provided at the third door 203' and the fourth door 204'.

The refrigerator 100' in the present specific example may be a single-door refrigerator having the first fitting portion 25' and the second fitting portion 15', or a side-by-side refrigerator, a multi-door refrigerator, or the like, having the first fitting portion 25' and the second fitting portion 15'.

Figure 24:
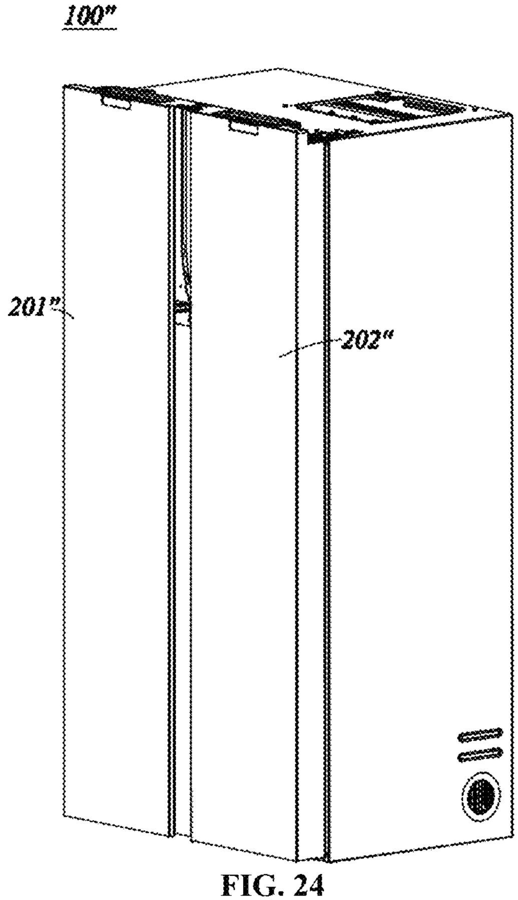
FIG. 24 is an overall schematic diagram of the refrigerator in another specific example of the present invention.
Figure 25:
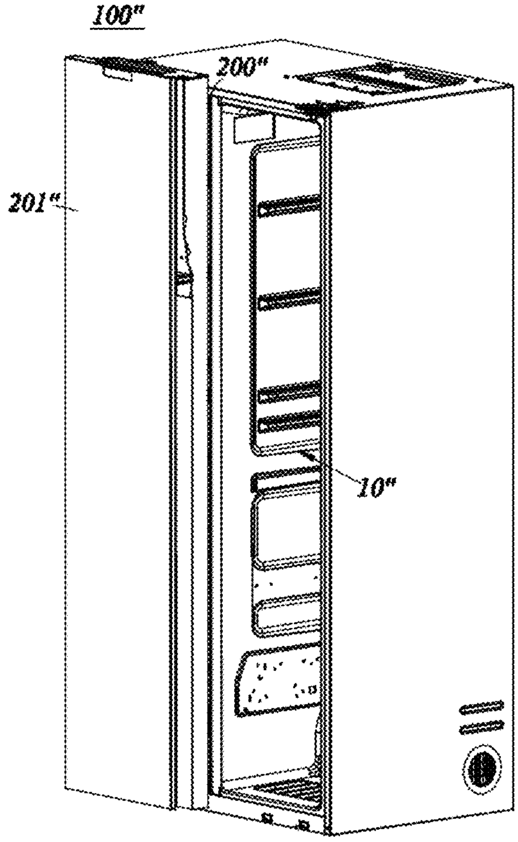
FIG. 25 is a schematic diagram of the refrigerator in another specific example of the present invention with a part omitted.

In other specific examples, the refrigerator 100' may not include the first fitting portion 25' and the second fitting portion 15'; with reference to FIGS. 24 and 25, the refrigerator 100' is configured as a side-by-side refrigerator 100", the refrigerator 100" includes two compartments distributed at intervals, and the two compartments are spaced apart from each other by a fixed beam 200"; the refrigerator 100" further includes a first door 201" and a second door 202" corresponding to the two compartments respectively, and the first door 201" and the second door 202" are provided adjacent to each other; when the refrigerator 100" is in a closed state, both the first door 201" and the second door 202" contact the fixed beam 200" to achieve a sealing effect, and when the first door 201" and/or the second door 202" are/is opened from the closed state to the first opening angle α1, the first door 201" and/or the second door 202" rotate(s) in situ relative to the cabinet 10".

Here, when the first door 201" is displaced horizontally when opened, the first door 201" and the second door 202" are unable to be opened normally due to interference therebetween, but the first door 201" and the second door 202" rotate in situ when the refrigerator 100" in this example is opened, thus effectively avoiding the interference between the adjacent first and second doors 201", 202".

Certainly, the type of the refrigerator 100 is not limited to the above-mentioned specific examples, and may be determined according to actual situations.

In another embodiment of the present invention, referring to FIGS. 1 to 25, a refrigerator 100 includes a cabinet 10, a door 20 for opening and closing the cabinet 10, and a hinge assembly 30 for connecting the cabinet 10 and the door 20.

The cabinet 10 includes a rear wall 11 and an opening 12 which are provided opposite to each other, and a direction from the rear wall 11 towards the opening 12 serves as a first direction X.

The hinge assembly 30 includes a first shaft 311, a first groove 321, a second shaft 312 and a second groove 322, the first shaft and the first groove are fitted with each other, and the second shaft and the second groove are fitted with each other.

The first groove 321 includes an initial position A1 and a pivot position A2, and the second groove 322 includes a first end 3221, a second end 3222, a first section L1 and a second section L2, the first end and the second end being provided oppositely, and the first section and the second section being located between the first end 3221 and the second end 3222 and connected with each other.

Referring to FIGS. 6 and 7, when the door 20 is in a closed state, the first shaft 311 is located at the initial position A1, the second shaft 312 is located at the first end 3221, and the door gasket 22 and the front end surface 14 of the cabinet 10 contact each other to achieve a sealing effect.

Referring to FIGS. 8 and 9, when the door 20 is opened from the closed state to a first opening angle α1, the second shaft 312 moves in the first section L1 to drive the first shaft 311 to move from the initial position A1 to the pivot position A2, the door 20 moves away from the cabinet 10 in the first direction X.

With reference to FIGS. 10 and 11, when the door 20 is continuously opened from the first opening angle α1 to a maximum opening angle α2, the first shaft 311 is kept at the pivot position A2, and the second shaft 312 moves in the second section L2 around the first shaft 311.

Here, in the opening process of the door 20, the door 20 moves away from the cabinet 10 in the first direction X; that is, the door 20 moves away from a front end of the cabinet 10, such that mutual separation of the door 20 and the cabinet 10 may be assisted under the action of the hinge assembly 30, thereby improving door opening smoothness.

In the present embodiment, the cabinet 10 includes an outer side surface 13 adjacent to the hinge assembly 30 and located on an extension section of a rotation path of the door 20, and a front end surface 14 provided around the opening 12.

The door 20 includes a door body 21 and a door gasket 22 connected to each other, and the door gasket 22 includes a side door gasket 221 close to the outer side surface 13.

When the door 20 is in the closed state, the door gasket 22 and the front end surface 14 contact each other.

When the door 20 is in the opening process, a distance between the side door gasket 221 and the front end surface 14 is increased.

Here, in the opening process of the door 20, the door 20 moves away from the cabinet 10 in the first direction X, and the distance between the side door gasket 221 and the front end surface 14 increases; that is, the hinge assembly 30 may assist separation of the door gasket 22 from the front end surface 14 of the cabinet 10, thus avoiding that the door 20 is unable to be smoothly separated from the cabinet 10 due to obstruction of the door gasket 22 (for example, the door gasket 22 is excessively pressed, and a magnetic attraction acting force is excessively high), and facilitating a user to open the door 20.

For other descriptions of the present embodiment, reference may be made to the foregoing description, which is not repeated herein.

In conclusion, in the present invention, due to the double-shaft and double-groove fitting structure of the first shaft 311, the first groove 321, the second shaft 312, and the second groove 322, in the opening process of the door 20, the door 20 moves away from the cabinet 10 in the first direction X, and the distance between the side door gasket 221 and the front end surface 14 increases, thus avoiding that the door 20 is unable to be smoothly separated from the cabinet 10 due to the obstruction of the door gasket 22, and facilitating the user to open the door 20.

The above embodiments are merely used for explaining the technical solution of the present invention and not limiting. Although the present invention have been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. A refrigerator, comprising cabinet, a door for opening and closing the cabinet, and a hinge assembly for connecting the cabinet and the door, wherein the hinge assembly comprises a first shaft and a first groove which are fitted with each other, the first groove comprises an initial position and a pivot position, when the door is in the opening process, the first shaft moves from the initial position to the pivot position, the door comprises a front wall apart from the cabinet and a side wall always interposed between the front wall and the cabinet, when the first groove is located at the door, a distance between the initial position and the front wall is less than a distance between the pivot position and the front wall, and a distance between the initial position and the side wall is greater than a distance between the pivot position and the side wall; when the first groove is located at the cabinet, a distance between the initial position and the front wall is greater than a distance between the pivot position and the front wall, and a distance between the initial position and the side wall is less than a distance between the pivot position and the side wall.

2. The refrigerator according to claim 1, wherein the hinge assembly further comprises a second shaft and a second groove which are fitted with each other, the first shaft is located in one of the cabinet and the door, the first groove is located in the other of the cabinet and the door, the second shaft is located in one of the cabinet and the door, and the second groove is located in the other of the cabinet and the door.

3. The refrigerator according to claim 2, wherein the second groove comprises a first end and a second end which are provided oppositely, when the door is in a closed state, the first shaft is located at the initial position, and the second shaft is located at the first end, when the door is opened from the closed state to a maximum opening angle, the second shaft moves from the first end to the second end to drive the first shaft to move from the initial position to the pivot position.

4. The refrigerator according to claim 2, wherein the second groove comprises a first end, a second end, a first section and a second section, the first end and the second end being provided oppositely, and the first section and the second section being located between the first end and the second end and connected with each other; when the door is in a closed state, the first shaft is located at the initial position, and the second shaft is located at the first end; when the door is opened from the closed state to a first opening angle, the second shaft moves in the first section to drive the first shaft to move from the initial position to the pivot position; when the door is continuously opened from the first opening angle to a maximum opening angle, the first shaft is kept at the pivot position, and the second shaft moves in the second section around the first shaft.

5. The refrigerator according to claim 2, wherein the second groove comprises a first end, a second end, a first section, a second section and a third section, the first end and the second end being provided oppositely, and the first section, the second section and the third section being located between the first end and the second end and connected; when the door is in a closed state, the first shaft is located at the initial position, and the second shaft is located at the first end; when the door is opened from the closed state to a first opening angle, the first shaft is kept at the initial position, and the second shaft moves in the first section around the first shaft; when the door is continuously opened from the first opening angle to a maximum opening angle, the second shaft moves in the second section to drive the first shaft to move from the initial position to the pivot position.

6. The refrigerator according to claim 2, wherein the second groove comprises a first end, a second end, a first section, a second section and a third section, the first end and the second end being provided oppositely, and the first section, the second section and the third section being located between the first end and the second end and connected; when the door is in a closed state, the first shaft is located at the initial position, and the second shaft is located at the first end; when the door is opened from the closed state to a first opening angle, the first shaft is kept at the initial position, and the second shaft moves in the first section around the first shaft; when the door is continuously opened from the first opening angle to a second opening angle, the second shaft moves in the second section to drive the first shaft to move from the initial position to the pivot position; when the door is continuously opened from the second opening angle to a maximum opening angle, the first shaft is kept at the pivot position, and the second shaft moves in the third section around the first shaft.

7. The refrigerator according to claim 1, wherein when the door is in a closed state, the first shaft is located at the initial position, when the door is opened from the closed state, the first shaft moves from the initial position to the pivot position.

8. The refrigerator according to claim 1, wherein when the door is in a closed state, the first shaft is located at the initial position; when the door is opened from the closed state to a first opening angle, the first shaft rotates in situ in the initial position, when the door is continuously opened from the first opening angle, the first shaft moves from the initial position to the pivot position.

9. The refrigerator according to claim 8, wherein the door is provided with a first fitting portion, and the cabinet is provided with a second fitting portion, when the door is in the closed state, the first fitting portion and the second fitting portion are engaged with each other, when the door is opened from the closed state to a first opening angle, the first fitting portion is disengaged from the second fitting portion.

10. The refrigerator according to claim 1, wherein the first groove is located at the door, a distance between a center of the first shaft at the initial position and the front wall is less than a distance between a center of the first shaft at the pivot position and the front wall, a distance between the center of the first shaft at the initial position and the side wall is greater than a distance between the center of the first shaft at the pivot position and the side wall.

11. The refrigerator according to claim 1, wherein the initial position and the pivot position are located at opposite ends of the first groove.

12. The refrigerator according to claim 2, wherein the first shaft and the second shaft are located at the cabinet, when the door in a closed state, the first shaft is proximate to the side wall in comparison to the second shaft.

13. The refrigerator according to claim 2, wherein the first shaft and the second shaft are located at the cabinet, when the door in a closed state, the first shaft is proximate to the front wall in comparison to the second shaft.

14. A refrigerator, comprising cabinet, a door for opening and closing the cabinet, and a hinge assembly for connecting the cabinet and the door, wherein the hinge assembly comprises a first shaft and a first groove which are fitted with each other, the first shaft is located at the cabinet, the door comprises a front wall apart from the cabinet and a side wall always interposed between the front wall and the cabinet, a first distance is formed between the center of the first shaft and the front wall, a second distance is formed between the center of the first shaft and the side wall, when the door is in the opening process, the first distance increases, and the second distance decreases at the same time.

15. The refrigerator according to claim 14, wherein the hinge assembly further comprises a second shaft and a second groove which are fitted with each other, the first shaft is located in one of the cabinet and the door, the first groove is located in the other of the cabinet and the door, the second shaft is located in one of the cabinet and the door, and the second groove is located in the other of the cabinet and the door.

16. The refrigerator according to claim 14, wherein the first groove comprises an initial position and a pivot position, a distance between a center of the first shaft at the initial position and the front wall is less than a distance between a center of the first shaft at the pivot position and the front wall, a distance between the center of the first shaft at the initial position and the side wall is greater than a distance between the center of the first shaft at the pivot position and the side wall.

17. The refrigerator according to claim 14, wherein the first groove comprises an initial position and a pivot position, when the door is in the opening process, the first shaft moves from the initial position to the pivot position, the first distance increases, and the second distance decreases at the same time.

18. The refrigerator according to claim 17, wherein when the door is in a closed state, the first shaft is located at the initial position, when the door is opened from the closed state, the first shaft moves from the initial position to the pivot position.

19. The refrigerator according to claim 17, wherein when the door is in a closed state, the first shaft is located at the initial position; when the door is opened from the closed state to a first opening angle, the first shaft rotates in situ in the initial position, when the door is continuously opened from the first opening angle, the first shaft moves from the initial position to the pivot position.

* * * * *